Patented Feb. 7, 1950

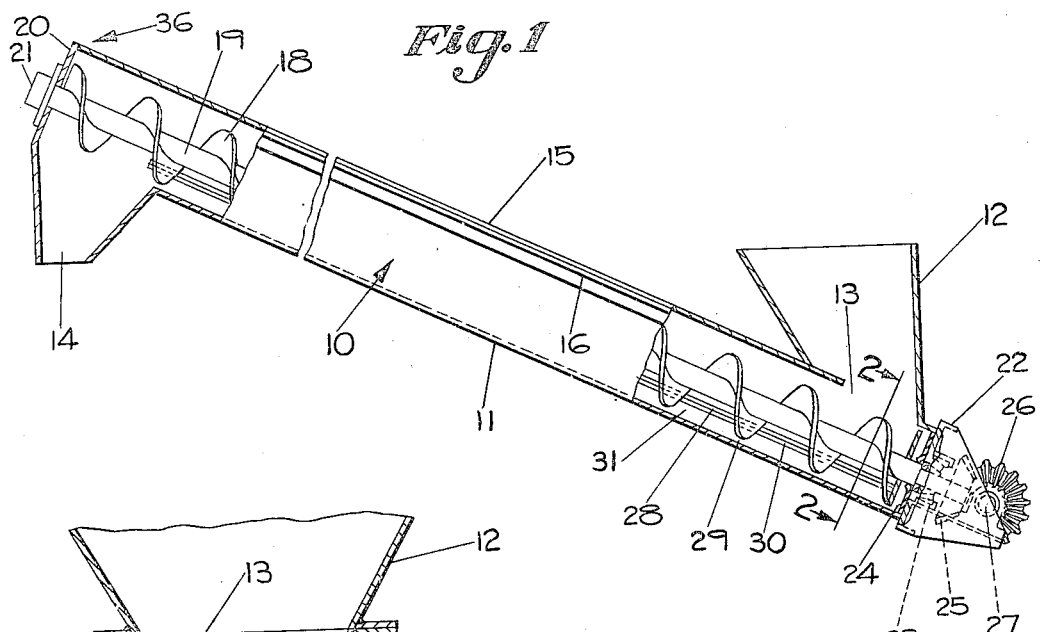
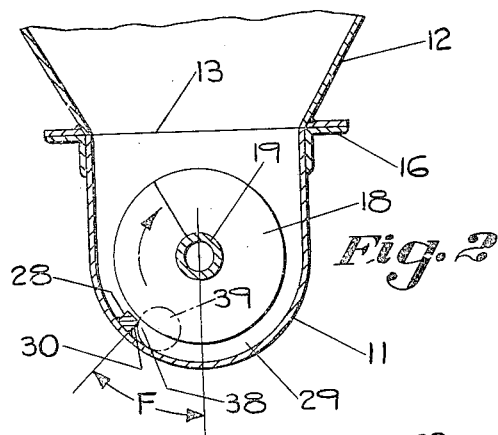
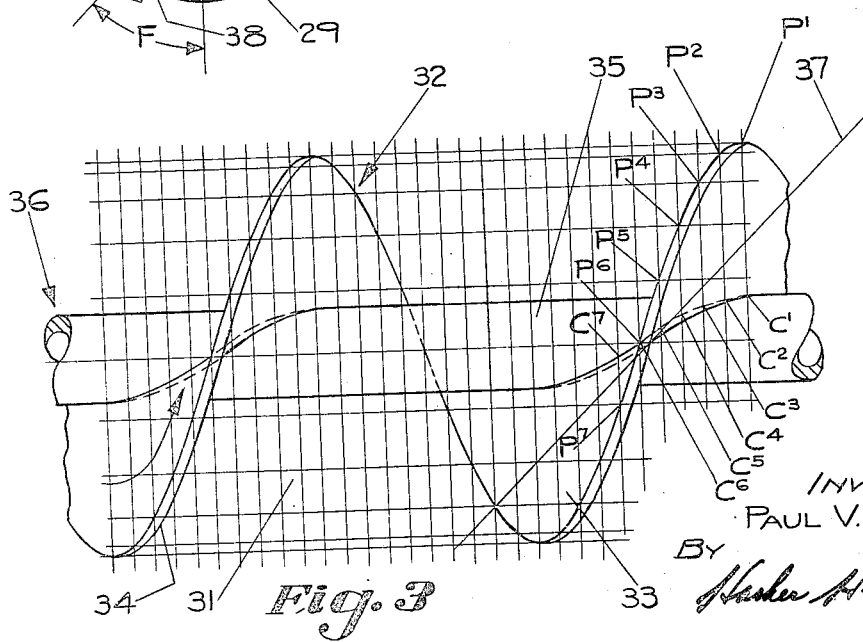

2,496,764

UNITED STATES PATENT OFFICE 2,496,764

SCREW CONVEYER

Paul V. Whitney, Columbus, Ohio, assignor to The Jeffrey Manufacturing Company, a corporation of Ohio Application March 29, 1946, Serial No. 658,262

2 Claims. (Cl. 198—213)

This invention relates to conveyers and more particularly to conveyers of the spiral, screw, or worm type.

The principal object of my invention is to provide an improved conveyer of the spiral, screw, or worm type, which is capable of conveying objects in an upward direction, which objects normally cannot be successfully conveyed in a spiral, screw, or worm type conveyer because they tend to roll or slide downwardly on the helix, spiral, or worm member of the conveyer.

In carrying out the principal object, it is another object of my invention to provide in a spiral conveyer a continuous shoulder which extends longitudinally of the worm or spiral thereof and cooperates with the casing of the conveyer to form a dam or pocket in the conveyer against or in which the objects being conveyed may be directed by gravity and/or centrifugal force and are there retained while being conveyed through the conveyer by the driven worm or spiral member thereof.

Other and further objects of the invention will appear hereinafter the novel features and combinations being set forth in the appended claims.

In the accompanying drawings,

Fig. 1 is a side sectional elevational view of a spiral, screw or worm type conveyer that embodies a form of my invention;

Fig. 2 is a view in cross-section, the view being taken on line 2—2 of Fig. 1; and Fig. 3 is a diagrammatic view or layout on a larger scale showing a fragment of a true helical screw or worm such as forms a working member of the spiral conveyer, the worm in Fig. 3 being a screw of opposite pitch to that of Fig. 1.

Referring to Fig. 1 of the drawings wherein a spiral, screw or worm conveyer 10 is shown, the conveyer includes a casing, housing or trough 11 which is connected to a feed hopper 12 in which objects to be conveyed by the conveyer are received. A feed opening 13 in the casing 11 connects the casing and hopper and directs objects in the hopper into the conveyer casing. At its upper end the casing 11 is provided with an outlet or discharge chute 14. Casing 11, hopper 12, and discharge chute 14 may be formed in any suitable manner, but preferably they are united so as to form a rigid assembly. The casing, housing or trough member 11 of the conveyer, as shown, is U-shaped in cross-section and is covered by a top plate 15 the edges of which are bolted to outwardly extending flanges 16 of the member 11. A screw or worm flight member 18 is contained within the casing 11 and is mounted therein by its central core or shaft 19, the upper end of which extends through an end wall 20 of the discharge end of the conveyer and is mounted in a bearing 21 carried thereby. The bottom end wall of the casing is formed by a bracket 22 that includes a bearing 23 which supports the lower end of the central core or shaft 19. A sealing washer 24 is provided in the conveyer casing adjacent the bottom end wall or bracket 22 for preventing dirt or other foreign matter from entering the bearing 23. The lower end of the shaft 19 carries a bevel gear 25 that meshes with a bevel gear 26 carried by a shaft 27. Shaft 27 is bearinged in the bracket 22 and may be driven to drive the screw or worm 18 through the gears 26 and 25 from any suitable source of power which may be, for example, an electric motor, not shown. The conveyer 10 thus far described may follow in construction that of the well known spiral conveyers at present in use.

Known screw conveyers may be used for conveying objects which have a tendency to roll or slide when the conveyer is in a horizontal position because the force of gravity causes the objects to seek the lowest level possible in the conveyer. The lowest level in a horizontally positioned worm conveyer is, of course, below the level of the top of the central shaft of the worm. The area below the top of the shaft is divided into a plurality of pockets by those portions of the worm which are below the top of the shaft and as the worm is rotated the pockets, in effect, are moved toward the discharge end of the conveyer and the objects therein are spilled from the conveyer.

If the screw conveyer is inclined so as to convey the objects upwardly, the level or capacity of each of the pockets is decreased. The level of each of the pockets is then determined by the lowest point on the top of the central shaft of the worm above each pocket. As the incline of the conveyer is increased the capacity of the pockets is decreased until such time as the pitch or lead angle of the worm is equalled by the central shaft of the worm and a horizontal plane intersecting it, at which time the pockets cease to exist and the objects in the conveyer will roll or slide downwardly freely along the worm.

Centrifugal force of the objects and friction between them and the worm also combine to play an important detrimental role since they tend to cause the objects to follow or rotate with the worm to such extent, depending upon the incline of the conveyer, and the speed of rotation of the worm and its lead or pitch angle, as to cause some or all of the objects to be carried from pocket to pocket in the conveyer.

The reasons for the above-mentioned faults of known screw conveyers for conveying objects which tend to roll or slide are discussed in detail hereinafter in connection with my invention which makes use of the effects of gravity and centrifugal force of the objects and provides a simple remedy for the faults of known screw type conveyers briefly discussed above.

For the purpose of illustration of my invention, the worm 32, shown in Fig. 3, is of opposite pitch to the worm 18 of Fig. 1. Assuming the worm 32 seen in Fig. 3 to be in a horizontally positioned conveyer casing, then a plurality of pockets or chambers 31 may be said to be defined in the lower portion of the housing by a propelling or front surface 33 of the worm 32 which engages objects to propel them, a back side 34 of the adjacent forward convolution of the worm, and the top edge of a central core or shaft 35 of the worm 32. Further assuming, for the purpose of illustration, that a quantity, not great enough to fill the conveyer casing, of round objects, such as balls, are to be conveyed, the pockets 31 will be filled with them, and should the level of the balls in any given pocket exceed the height of the top of the central core or shaft 35 of the worm 32, those objects which are above the shaft will be spilled over the shaft into the next or following pocket 31. Should the discharge end 36 of the conveyer be elevated to place the conveyer in an incline, the capacity of the pockets 31 is reduced.

Referring to the layout of the true helical worm shown in Fig. 3, the lines P1—C1, P2—C2, etc., represent planes which are perpendicular to the axis of the central core or shaft 35, the points P showing the intersection of the outer periphery of the helical member of the worm and the planes and the points C showing the intersections of the inner periphery of the helical member of the worm and the planes or where the inner periphery of the helical member, the central core 35 and the planes P—C intersect. It will be seen in Fig. 3 that when the conveyer is placed in an inclined position, as by elevating the discharge end 36 of the conveyer, the level in each pocket 31, below which balls will be contained therein, will be determined by a horizontal plane 37 tangent with the highest point on the curve C, which curve is a line intersecting all of the points C on the propelling surface 33 of worm 32, and this will be true until the incline of the conveyer is increased to such degree that the horizontal plane or pocket level 37 becomes tangent with the curve C at the point C6. Should the angle of incline of the conveyer be increased beyond this degree the point C6 will remain tangent with the horizontal plane 37.

Considering all of the P—C planes which are perpendicular to the axis of the central core or shaft 35, where these planes intersect the helical member of the worm at their respective points P and C, any line P—C will intersect the axis of the central core or shaft, that is, they will be true radial lines. Considering now the line P6—C6 which appears as a point in Fig. 3 because the line P6—C6 is horizontal, it will be seen that line P7—C7 which is to the left of line P6—C6 is below line P6—C6 and slopes outwardly, downwardly from the point C7 to the point P7. Considering the line P5—C5 which is to the right of line P6—C6 it will be seen that the plane of this line slopes inwardly from the point P5 to the point C5. Thus an object below the line P6—C6 will tend to roll outwardly, downwardly and into the pocket or chamber 31, and an object above the line P6—C6 will tend to roll downwardly and inwardly and should the point C6 be tangent with the horizontal plane 37, the object will roll downwardly on the curve C and spill into the next pocket 31.

Actually when a screw, spiral or worm conveyer is in operation there is considerable friction between the flight of the worm and the objects being conveyed and this friction causes the objects to be carried upwardly across the plane P6—C6 and out of the pocket 31 into the next adjacent or following pocket. The action of the flight upon the objects being conveyed also causes the objects to be thrown outwardly against the casing 11 of the conveyer.

A critical feature of my invention resides in the provision of an abutment member 28 within the casing 11, the relationship between the inner surface of the casing 11 and the periphery of the screw or worm 18, the relative position of the abutment member 28 with respect to the angle of incline of the conveyer 10 and the lead of the worm or helical member 18 thereof.

It will be seen from a further description of my invention that the abutment member 28 must be placed in the conveyer in definite relation with the pitch or lead angle of the worm or helical member and the angle of incline of the conveyor in order to realize the maximum efficiency of my improved conveyer.

The abutment member 28 as seen in Fig. 1 extends longitudinally within the casing 11 from beneath the feed opening 13 to adjacent the outlet or discharge chute 14. The abutment member 28 may, if desired, extend above the chute 14 but it should not extend to the upper end wall 20 of the casing 11.

In practising my invention, the diameter of the screw or worm 18 is such that a space 29 is provided between the outside or periphery of the worm 18 and the inside of the casing 11. The abutment 28 is shown as being formed of a continuous bar which may be welded or otherwise secured to the casing 11, but it is to be understood that any means may be employed which will provide an inwardly extending abutment or shoulder 30 (see Fig. 2). For example, the casing may be formed as by bending it to provide said shoulder 30.

Referring again to Fig. 2, I have found that by providing the abutment member 28 or shoulder 30 in a position adjacent any of the points below the axis of shaft 19 depending upon the incline of the conveyer, objects which are directed outwardly, downwardly by gravity and centrifugal force into the pockets 31 will not be carried upwardly to the plane P6—C6 and that a plurality of objects may be successfully conveyed in an upward direction in a spiral conveyer. It will be seen, of course, that when the horizontal plane 37 lies substantially in the plane of the helix angle of outer periphery of the worm, the objects will be retained in a pocket or trough 38 substantially wholly by centrifugal force imparted to them by the rotating worm. However, in all angles of incline of the conveyer before the horizontal plane 37 coincides with the helix angle of the outer periphery of the worm, gravity plays an important role in assisting to retain the objects in the pocket or trough 38. In Fig. 2 a ball 39 is shown in the trough 38.

It will be understood by those skilled in the art that the position of the shoulder 30, represented in Fig. 2 by the angle F, will be nearer to the lowermost longitudinal plane of the casing as either or both the lead of the helix is increased or the angle of incline of the conveyer is increased up to that angle wherein the horizontal plane 37 coincides with the helix angle of the outer periphery of the worm, that is, as either of the above are increased the angle F is described.

In practice the worms or helical members of conveyers are not formed as true helices, however, while in the foregoing description of my invention I have described it in connection with a true helix it will be seen that the invention is equally applicable to conveyers wherein the worms are not true helices by changing the position of the shoulder 30 in accordance with the grade lines of the worms, that is, by determining the correct angle F for the given worm.

From the foregoing it will be seen that a conveyer constructed in accordance with my teachings is capable of conveying objects which tend to roll or slide when the conveyer is in a substantially vertical plane and that such objects will be conveyed upwardly in the trough 38 in a substantially continuous stream, that is, the objects will tend to stack, above and behind one another in the trough 38.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A screw conveyer adapted to convey objects upwardly which tend to roll including in combination a casing having inlet and discharge openings, a power driven worm in said casing, a longitudinally and inwardly extending abutment extending between said inlet and discharge openings parallel to the axis of said worm and extending inwardly of said casing and adjacent the outer edge of said worm, said abutment cooperating with said casing and worm for forming pockets into which objects being conveyed are directed and moved by said worm toward said discharge opening, and means for rotating said worm in a direction whereby bottom peripheral portions of said worm move toward said abutment and whereby frictional contact between said worm and objects in the bottom of said casing moves said objects against said abutment.

2. A screw conveyer for conveying objects upwardly which tend to roll including in combination a casing having a longitudinally extending shoulder, a power driven worm in said casing, the outer peripheral surface of which rotates adjacent an edge of said shoulder, said shoulder being positioned so that objects in said conveyer are directed thereagainst and thereby prevented from moving downwardly in the conveyer, and means for rotating said worm in a direction whereby bottom peripheral portions of said worm move toward said shoulder and whereby frictional contact between said worm and objects in the bottom of said casing moves said objects against said shoulder.

PAUL V. WHITNEY.

REFERENCES CITED

The following references are of record in the file of this patent:

UNITED STATES PATENTS

| Number | Name | Date |
|---|---|---|
| 1,044,845 | Argall | Nov. 19, 1912 |